(12) United States Patent
Baehr et al.

(10) Patent No.: US 8,561,463 B2
(45) Date of Patent: Oct. 22, 2013

(54) METHOD FOR THE AUTOMATIC DETECTION AND IDENTIFICATION OF ERRORS IN A BALANCING MACHINE

(75) Inventors: Joachim Baehr, Sulzbach (DE); Rolf Isermann, Seeheim-Jugenheim (DE); Dieter Thelen, Modautal (DE); Wolfgang Scheithe, Griesheim (DE)

(73) Assignee: Schenck RoTec GmbH, Darmstadt (DE)

(*) Notice: Subject to any disclaimer, the term of this patent is extended or adjusted under 35 U.S.C. 154(b) by 532 days.

(21) Appl. No.: 12/806,382

(22) Filed: Aug. 11, 2010

(65) Prior Publication Data

US 2011/0067493 A1 Mar. 24, 2011

(30) Foreign Application Priority Data

Aug. 20, 2009 (DE) .......................... 10 2009 038 011

(51) Int. Cl.
*G01M 1/16* (2006.01)

(52) U.S. Cl.
USPC ................................. 73/462; 700/279; 706/23

(58) Field of Classification Search
USPC ...................... 73/462, 760, 460, 66; 301/5.21; 700/279; 706/23
See application file for complete search history.

(56) References Cited

U.S. PATENT DOCUMENTS

| | | | | |
|---|---|---|---|---|
| 4,988,979 A | * | 1/1991 | Sasaki et al. | 340/683 |
| 5,313,407 A | * | 5/1994 | Tiernan et al. | 700/280 |
| 5,675,497 A | * | 10/1997 | Petsche et al. | 702/182 |
| 5,875,420 A | * | 2/1999 | Piety et al. | 702/182 |
| 6,553,837 B1 | * | 4/2003 | Lysen | 73/579 |
| 6,601,054 B1 | * | 7/2003 | Lo et al. | 706/30 |
| 6,618,646 B1 | * | 9/2003 | Dyer | 700/279 |
| 6,779,404 B1 | * | 8/2004 | Brincker et al. | 73/659 |
| 7,363,111 B2 | * | 4/2008 | Vian et al. | 700/279 |

(Continued)

FOREIGN PATENT DOCUMENTS

| | | |
|---|---|---|
| DE | 199 07 454 | 8/2000 |
| DE | 199 38 722 | 2/2001 |
| EP | 2 034 284 | 3/2009 |
| KR | 2001010811 A * | 2/2001 |

OTHER PUBLICATIONS

Rolf Isermann, "Fault-Diagnosis Systems: An Introduction from Fault Detection to Fault Tolerance," Springer 2006, Preface and pp. 2-5. (Spec, pp. 3-4).

*Primary Examiner* — Peter Macchiarolo
*Assistant Examiner* — Samir M Shah
(74) *Attorney, Agent, or Firm* — Collard & Roe, P.C.

(57) ABSTRACT

A method is disclosed for the automatic detection and identification of errors in a balancing machine during operation, in which a rotor provided with an unbalance is rotatably mounted in a vibratory bearing in the balancing machine and is set in rotation by a drive, the rotational frequency of the rotating rotor and the vibrations stimulated by the rotor are measured and measurement signals which comprise the measured values of the rotational frequency and the vibrations are generated and delivered to an evaluation computer. The evaluation calculation is based on mathematical models of the dynamic properties of the balancing machine which describe stimulations of the machine structure due to the unbalance, in particular in the balancing planes, and/or due to the rotor geometry and/or due to the bearing and/or possible damage to the bearing. Features such as vibration characteristics and/or process parameters are calculated by a signal-model-based method from the measurement signals, and discrepancies are established by comparing the calculated features with predetermined normal features of an error-free process.

16 Claims, 1 Drawing Sheet

(56) References Cited

U.S. PATENT DOCUMENTS

| | | | |
|---|---|---|---|
| 7,366,590 B2 * | 4/2008 | Balasu | 701/3 |
| 7,454,970 B2 * | 11/2008 | Dyer | 73/462 |
| 7,606,673 B2 * | 10/2009 | Judd | 702/56 |
| 7,722,322 B2 * | 5/2010 | Altieri et al. | 416/1 |
| 7,756,649 B2 * | 7/2010 | Baehr et al. | 702/56 |
| 7,954,376 B2 * | 6/2011 | Angantyr et al. | 73/458 |
| 8,041,520 B2 * | 10/2011 | Mesec | 702/58 |
| 8,100,009 B2 * | 1/2012 | Dyer | 73/462 |
| 8,234,925 B2 * | 8/2012 | Marconnet et al. | 73/660 |
| 8,272,265 B2 * | 9/2012 | Bucher et al. | 73/457 |
| 2002/0183942 A1 * | 12/2002 | Lafleur et al. | 702/56 |
| 2004/0249520 A1 * | 12/2004 | Maine | 701/3 |
| 2007/0062278 A1 * | 3/2007 | Dyer | 73/458 |
| 2007/0156289 A1 * | 7/2007 | Altieri et al. | 700/280 |
| 2007/0250246 A1 * | 10/2007 | Balasu | 701/101 |
| 2009/0070050 A1 * | 3/2009 | Baehr et al. | 702/56 |
| 2009/0093975 A1 * | 4/2009 | Judd | 702/34 |
| 2009/0293613 A1 * | 12/2009 | Bucher et al. | 73/462 |

* cited by examiner

METHOD FOR THE AUTOMATIC DETECTION AND IDENTIFICATION OF ERRORS IN A BALANCING MACHINE

CROSS REFERENCE TO RELATED APPLICATIONS

Applicants claim priority under 35 U.S.C. §119 of German Application No. 10 2009 038 011.6 filed Aug. 20, 2009.

FIELD OF THE INVENTION

The invention relates to a method for the automatic detection and identification of errors in a balancing machine during operation, a rotor provided with an unbalance being rotatably mounted in a vibratory bearing in the balancing machine and being set in rotation by a drive, the rotational frequency of the rotating rotor and the vibrations stimulated by the rotor being measured and measurement signals which comprise the measured values of the rotational frequency and the vibrations being generated and delivered to an evaluation computer.

BACKGROUND OF THE INVENTION

Balancing machines are used for balancing rotors. In this process, the mass distribution of a rotor in relation to the axis of rotation thereof is measured and is improved by adding or removing compensating masses until the forces and vibrations caused by the unbalance lie within acceptable limits. Some components of the mass distribution, for example the unbalance of moments, can only be determined during rotation. For this reason, a balancing machine comprises a rotatable bearing and a drive for the rotor as well as measurement means. To determine unbalance, the rotor is set in rotation, and as a result the forces due to unbalance generate vibrations which can be measured by a vibration sensor. The size and position of compensating masses are calculated from the measured values.

Errors in the measurement process, damage to the rotor and malfunctions of the balancing machine can lead to the calculation of incorrect compensating masses, in such a way that after the balancing process the rotor has an excessive residual unbalance. In more comprehensive production processes which include a balancing process, errors of this type may lead to serious failures and this may result in losses due to broken parts. There is therefore a great need to identify errors which occur during balancing using balancing machines as early as possible and largely to prevent interruptions and damage due to errors.

It is known to carry out automatic monitoring of balancing machines by randomly checking the balancing results. Various directly measurable values, such as driving power or vibration displacement, are checked individually to see whether they exceed limits. Furthermore, active safety measures protect against operating errors, for example by automatically switching off the drive when a predetermined rotational speed limit is exceeded. In general, detailed error identification is left to the specialist staff. In this case, the progression of the measurement results over time is generally analysed on the basis of a long measurement. Signal spectra and time frequency representations of the measurement results are also tested.

EP 2 034 284 A2 discloses a method for the detection and diagnosis of errors in a balancing machine, in which it is assumed that the process of the dynamic behaviour of the machine can be modelled as a linear, error-free system, an overdetermined set of linear equations being formed which contain input and output data of the process and unknown states of the assumed linear system, the number of states required to describe the dynamic behaviour being extracted using mathematical calculations such as orthogonal or diagonal projection to form a matrix of the same rank as the assumed linear system, and singular values being calculated using singular value decomposition to obtain an approximate feature for the order of the assumed linear system. This known process-model-based method is used to detect loose connections in the region of the sensor fixing or in the region of the base fixing.

DE 199 38 722 A1 further discloses a method for analysing rolling bearings built into machines, in which a signal generated by the rolling movement is captured by a sensor and the amplitude of the signal is evaluated to detect the presence of damage to a rolling bearing running surface. This takes into account a dynamic model of the rolling bearing in the machine, and this model takes into account at least the contact rigidity of the rolling bearing, on both sides, to calculate, for signal amplitude evaluation, the transfer function between a force caused by the damage and the corresponding sensor signal.

DE 199 07 454 A1 further discloses a method for model-based vibration diagnosis monitoring of rotating machines, which is intended to determine more precisely the links between the vibration properties of the machine and operating parameters. In this case, the monitoring and analysis are carried out in the operating phase, and the dynamics of the operating parameters are removed from the monitoring so as to differentiate between limits being exceeded because of fluctuations in the operating parameters and limits being exceeded because of actual state changes of the machine.

SUMMARY OF THE INVENTION

The object of the invention is to provide a method for the automatic detection and identification of errors in a balancing machine which can be used during normal balancing operation and is not detrimental to the time required for balancing a rotor. Error reports should be reliable and easy for the operator to interpret.

In the method according to the invention, for automatically detecting and identifying errors in a balancing machine during operation, a rotor provided with an unbalance being rotatably mounted in a vibratory bearing in the balancing machine and being set in rotation by a drive, the rotational frequency of the rotating rotor and the vibrations stimulated by the rotor are measured and measurement signals which comprise the measured values of the rotational frequency and the vibrations are generated and delivered to an evaluation computer, wherein the evaluation calculation is based on mathematical models of the dynamic properties of the balancing machine which describe stimulations of the machine structure due to the unbalance, in particular in the balancing planes, and/or due to the rotor geometry and/or due to the bearing and/or possible damage to the bearing, and features such as vibration characteristics and process parameters are calculated by at least one signal-model-based method from the measurement signals obtained during normal operation of the balancing machine, and discrepancies are established as error symptoms by comparing the calculated features with predetermined normal features of an error-free process.

Signal-model-based methods use measurement signals of the outputs of a dynamic system and a model of the nominal signal course for detecting and identifying errors, cf. R. Isermann, Fault-Diagnosis Systems, Springer 2006, Preface and pages 2 to 5.

The method according to the invention makes self-monitoring of a balancing machine possible, making it possible to check during the normal balancing process whether the measurement result is correct. A series of errors which may have occurred can be identified and diagnosed in a single test run. The method according to the invention can be adapted to various operating states and is suitable for identifying a large number of possible error states and diagnosing of the causes thereof. Various signal models, such as constant-frequency vibrations, stochastic signals, and variable-frequency vibrations, can be used for error identification. Therefore, by simultaneously using a plurality of signal models, the most important machine states can be monitored for the absence of errors using the measurement signals detected during balancing. The method is particularly advantageous for monitoring balancing machines which are operated subcritically and in which the run-up and shutdown take several seconds, during which unbalances are not identified. However, the method can also be applied to other balancing machines in which these conditions are not met. With the method according to the invention, symptom-error allocation is still possible, albeit more difficult, in machines which are operated supercritically.

To increase the reliability of the method according to the invention and monitor a greater number of potential errors, according to a further proposal of the invention, features can additionally be calculated using a process-model-based method and discrepancies can be established by comparison with predetermined normal features of an error-free process.

Process-model-based methods use measurement signals of inputs, e.g. stimulations, and outputs, e.g. responses to stimulations, of a dynamic system in combination with dynamic model of the input and output behaviour (process-model) for detecting and identifying errors, cf. R. Isermann, Fault-Diagnosis Systems, Springer 2006, Preface and pages 2 to 5.

The method according to the invention can further be advantageously developed in that the discrepancies, as error symptoms, are allocated to error types, and the error symptoms allocated to one or more error types are evaluated to determine the causes of errors.

The evaluation can be carried out using a rule-based error diagnosis system based on fuzzy logic, the probability of the occurrence of each error being determined by the intermediate steps of converting the error symptoms into linguistic variables (fuzzification) and evaluating the "IF" part (aggregation) and the "THEN" part (accumulation) of each rule of the rule base.

Signal-model-based methods use mathematical models to generate features. Examples of signal models include stationary vibrations, variable-frequency vibrations and stochastic signals. The following discloses a plurality of methods provided by the invention which are based on signal models and which may advantageously be used for the automatic monitoring and calculation of errors in a balancing machine.

BRIEF DESCRIPTION OF THE DRAWING

The invention will now be explained with reference to the drawing, which shows a flow diagram of the method steps according to the invention.

DETAILED DESCRIPTION OF THE EMBODIMENT

Figure 1:
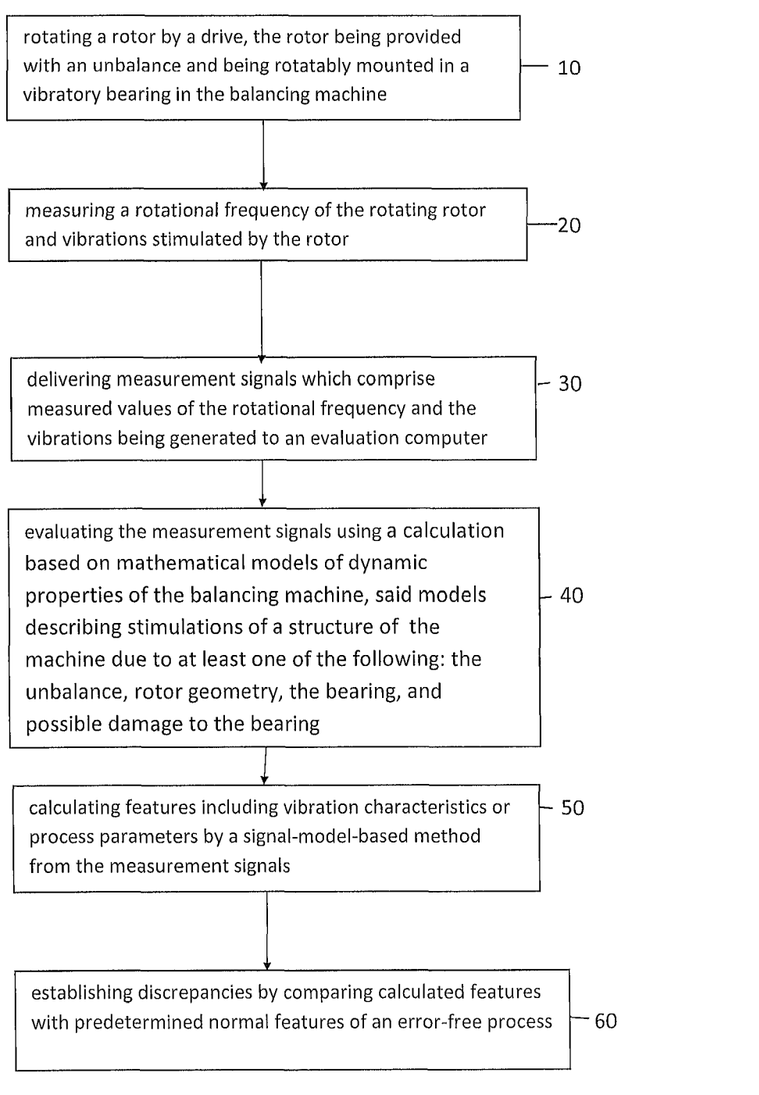

As shown in the drawing, the invention relates to a method for detection and identification of errors in a balancing machine, in which a first step 10 comprises rotating a rotor by a drive, the rotator being provided with an unbalance and being rotatably mounted in a vibratory bearing in the balancing machine. In a second step 20, a rotational frequency of the rotating rotor and vibrations stimulated by the rotor is measured. In step 30, measurement signals which comprise measured values of the rotational frequency and the vibrations being generated are delivered to an evaluation computer. Step 40 comprises evaluating the measurement signals using a calculation based on mathematical models of dynamic properties of the balancing machine, said models describing stimulations of a structure of the machine due to at least one of the following: the unbalance, rotor geometry, the bearing, and possible damage to the bearing. In step 50, features including vibration characteristics or process parameters are calculated by a signal-model-based method from the measurement signals. Finally, in step 60, discrepancies are established by comparing calculated features with predetermined normal features of an error-free process. The calculations for determining the errors are described in further detail below.

1. Monitoring the Amplitude of the Unbalance Signal

The main stimulations acting on a balancing machine are the unbalance forces $F_u(t)$, which correspond to vibrations at the rotational frequency. During run-up for accelerating a rotor, the rotational speed $\omega_r(t)$ of the machine varies as a function of time. The amplitude of the vibration of the unbalance stimulations varies in a fixed pattern.

$$F_u(t) = -\underbrace{m_u r_r \omega_r^2(t)}_{Amplitude}\cos\Big(\varphi_r(t) + \underbrace{\varphi_u}_{Phase\ of\ the\ vibration}\Big)$$

The machine structure reacts to a stimulation of this type with a vibration at the rotational frequency with altered amplitude and phase. The amplitude monitoring method calculates the amplitude and angular position of the vibration at the rotational frequency and generates various features from the progression thereof. In the absence of errors, the progression of the unbalance stimulations is given by $$F_{u1,u}(t) = -m_{u1} r_r \omega_r^2(t)\cos(\varphi_r(t) + \varphi_{u1})$$

$$F_{u2,u}(t) = -m_{u2} r_r \omega_r^2(t)\cos(\varphi_r(t) + \varphi_{u2})$$

for both bearing points of the rotor. The speed and angle of rotation are calculated as $$\varphi_r(t) = \frac{d}{dt}\omega_r(t) = \frac{\alpha_{r0}}{2}t^2 + \omega_{r0}t$$

$$\omega_r(t) = \frac{d}{dt}\varphi_r(t) = \alpha_{r0}t + \omega_{r0}$$

$$\alpha_r(t) = \frac{d}{dt}\omega_r(t) = \alpha_{r0}$$

This assumes that the rotor accelerates at a constant rotational acceleration $\Delta_{r0}$ and that the rotor has speed $\omega_{r0}$ when it passes through the zero angular position. In the absence of errors a reduced model is applicable, and, ignoring the noise effects, this results in measured signals, measured by moving coils at the two bearing points, of $$U_{Ts1}(t) = \frac{\Psi_{01}}{c_{a1}} \frac{d}{dt} F_{u1,u}(t)$$

$$= \frac{\Psi_{01}}{c_{a1}} m_{u1} r_r \omega_r^3(t)\sin(\varphi_r(t) + \varphi_{u1})$$

-continued $$U_{Ts2}(t) = \frac{\Psi_{02}}{c_{a2}} \frac{d}{dt} F_{u2,u}(t)$$

$$= \frac{\Psi_{02}}{c_{a2}} m_{u2} r_r \omega_r^3(t) \sin(\varphi_r(t) + \varphi_{u2})$$

in which:

$m_{u1}$, $m_{u2}$ are the unbalance masses
$\phi_{u1}$, $\phi_{u2}$ are the unbalance angles
$r_r$ is the unbalance radius
$\Psi_{01}$, $\Psi_{02}$ are the magnetic flux constants of the moving coil sensors
$c_{a1}$, $c_{a2}$ are the rigidities of the bearing points The amplitude and phase position of the vibrations are combined in a complex amplitude $A_v = |A_v|e^{(j \angle A_v)}$.

$$U_{Ts1}(t) = \underbrace{\frac{\Psi_{01}}{c_{a1}} m_{u1} r_r \omega_r^3(t)}_{|A_{v1}(\omega_r(t))|} \sin\left(\varphi_r(t) + \underbrace{\varphi_{u1}}_{\angle A_{v1}(\omega_r(t))}\right)$$

$$U_{Ts2}(t) = = \underbrace{\frac{\Psi_{02}}{c_{a2}} m_{u2} r_r \omega_r^3(t)}_{|A_{v2}(\omega_r(t))|} \sin\left(\varphi_r(t) + \underbrace{\varphi_{u2}}_{\angle A_{v2}(\omega_r(t))}\right)$$

The object of the amplitude monitoring is to determine the amplitudes $A_{v1}(\omega_r(t))$, $A_{v2}(\omega_r(t))$ which are dependent on the rotational speed from the signals of the moving coils at the two bearing points. A comparison with the expected progression is used to form features. It is assumed that the rotational speed signal $\omega_r(k)$ and the moving coil signals $U_{Ts1}(k)$, $U_{Ts2}(k)$ have discrete sampled values. Processing takes place separately for the two moving coils. Hereinafter, $U_{Ts}(k)$ is used to represent $U_{Ts1}(k)$, $U_{Ts2}(k)$. The measurement signals are initially low-pass filtered. The filtered measurement signal $U_{Ts,Tp}(k)$ is subjected to a wavelet transformation. The rotational speed at time k, $\omega(k)$, and the angular acceleration $\Delta_0$ are used to calculate the quantised variant of the modified Morlet wavelet $\Psi_{MW,mod}(k_1)$. $k_1$ is used as an auxiliary variable for calculating the wavelet and the wavelet transformation. For the wavelet with linearly increasing frequency, this results in $$\Psi_{MW,mod}(t = k_1 T_0, \omega(k)) = \Phi(k_1 T_0) e^{\left(j\omega(k)T_0 k_1 + j\frac{a_0}{2}(T_0 k_1)^2\right)}$$

$U_{Ts,Tp}$ corresponds to the "sweep" signal type, i.e. a vibration having a linearly increasing rotational speed. With the wavelet transformation, the instantaneous amplitude $A_{WV}$ of the vibrations can be calculated for each time k. The discrete variant of the wavelet-transformed CWT (continuous wavelet transform) is approximated by $$CWT(k) = T_0 \sum_{k_1 = -\infty}^{\infty} U_{Ts,Tp}(k_1) \Psi_{MW,mod}(k_1 - k, \omega(k))$$

$$= A_{WV1}(\omega_r(k))$$

The wavelet is localised for the calculation of the instantaneous amplitude $A_{WV}(k)$ at time k.

It is expedient to calculate the amplitude during run-up. There are two complex amplitude progressions $A_{WV,roh,1}(\omega_r(k))$, $A_{WV,roh,2}(\omega_r(k))$ for the moving coil signals $U_{Ts1}$, $U_{Ts2}$.

$$A_{WV,roh,1}(\omega_r(k)) = \frac{\Psi_{01}}{c_{a1}} m_{u1} r_r \omega_r^3(k) e^{(j(\varphi_r(k) + \varphi_{u1}))}$$

$$A_{WV,roh,2}(\omega_r(k)) = \frac{\Psi_{02}}{c_{a1}} m_{u2} r_r \omega_r^3(k) e^{(j(\varphi_r(k) + \varphi_{u1}))}$$

In a correction step, the current angular position of the rotor is corrected, resulting in an estimate of the complex amplitudes $A_{v1}(\omega_r(k))$, $A_{v2}(\omega_r(k))$.

$$A_{WV1}(\omega_r(k)) = e^{(-j\varphi_r(k))} A_{WV,roh,1}(\omega_r(k))$$

$$= \frac{\Psi_{01}}{c_{a1}} m_{u1} r_r \omega_r^3(k) e^{(j\varphi_{u1})}$$

$$\approx A_{v1}(\omega_r(k))$$

$$A_{WV2}(\omega_r(k)) = e^{(-j\varphi_r(k))} A_{WV,roh,2}(\omega_r(k))$$

$$= \frac{\Psi_{02}}{c_{a1}} m_{u2} r_r \omega_r^3(k) e^{(j\varphi_{u1})}$$

$$\approx A_{v2}(\omega_r(k))$$

The complex vibration amplitudes of the vibrations in the moving coil during run-up can be estimated by calculating the wavelet transforms. $A_{WV1}$ corresponds to an estimate of the amplitude progression of the vibration in the signal $U_{Ts1}$ and $A_{WV2}$ corresponds to an estimate of the amplitude progression of the vibration in the signal $U_{Ts2}$. As stated above, the vibration component is calculated in the moving coil as a function of the stimulating force.

$$U_{Ts1}(t) = \frac{\Psi_{01}}{c_{a1}} \frac{d}{dt} F_{u1,u}(t)$$

$$U_{Ts2}(t) = \frac{\Psi_{02}}{c_{a2}} \frac{d}{dt} F_{u2,u}(t)$$

In the following, a third amplitude progression which estimates the unbalance force couple $F_{Kpu}$ is to be used. In the absence of errors, the force couple is calculated as $$F_{Kpu} = F_{u1,u} - F_{u2,u}$$

In the case of errors, the effects of constraining forces must be taken into account. Subtracting the normalised voltages $$\frac{c_{a1}}{\Psi_{01}} U_{Ts1}(t) \text{ and } \frac{c_{a1}}{\Psi_{02}} U_{Ts2}(t)$$

$$\frac{c_{a1}}{\Psi_{01}} U_{Ts1}(t) - \frac{c_{a2}}{\Psi_{02}} U_{Ts2} = \frac{d}{dt} F_{u1,u}(t) - \frac{d}{dt} F_{u2,u}(t)$$

$$= \frac{d}{dt} F_{Kpu}(t)$$

results in the first derivative of the unbalance force couple. Since $A_{WV1}$ estimates the vibration progression of $U_{Ts1}$ and $A_{WV2}$ estimates the vibration progression of $U_{Ts2}$, the amplitude progression $$A_{WV12} = \frac{c_{a1}}{\Psi_{01}} A_{WV1} - \frac{c_{a2}}{\Psi_{02}} A_{WV2}$$

results in an amplitude and vibration phase progression as a function of the unbalance force couple. This means that three amplitude progressions are available which can be used for error identification, namely the amplitude progression $A_{WV1}(\omega_r)$ of the vibration in the moving coil signal $U_{Ts1}$, the amplitude progression $A_{WV2}(\omega_r)$ of the vibration in the moving coil signal $U_{Ts2}$, and the amplitude progression $A_{WV12}(\omega_r)$ of the reconstructed unbalance moment $A_{WV12}$.

For feature generation, progressions are initially calculated and evaluated. First, the progressions of the individual measurement signals at the two bearing points are analysed. Two features $M_{AU,1}=A_{std1}$, $M_{AU,2}=A_{std2}$ are calculated from the amplitude values of the individual signals.

$$A_{std1} = \sigma(|A_{WV1}(\omega_r)|)$$

$$A_{std2} = \sigma(|A_{WV2}(\omega_r)|)$$

The standard deviation $\sigma$ is a statistical measure of the dispersion of the amplitude values. If there are N values $A_{WV}(\omega_r(k))$, then $A_{std}$ is calculated as $$A_{std} = \sigma(|A_{WV}(\omega_r)|)$$
$$= \sqrt{\frac{1}{N-1} \sum_{k=1}^{N} (|A_{WV}(\omega_r(k))| - |\overline{A_{WV}}|)^2}$$

A third feature is calculated from the amplitude progression of the reconstructed unbalance force couple $A_{WV12}(\omega_r)$. This amplitude progression $A_{WV12}(\omega_r)$ is affected by various components. The unbalance vibrations appear as components in the third power of the rotational speed. Their contribution can be represented as the product of a constant complex number $A_u e^{(j\Phi u)}$ and the factor $\omega_r^3(k)$. Constraining forces appear in the unbalance force couple as a harmonic vibration of constant amplitude. $A_{WV12}(\omega_r)$ corresponds to the reconstruction of the derivative of the unbalance force couple. The contribution of the constraining forces therefore occurs as a component proportional to the first power of the rotational speed and can be expressed as the product of a complex number $A_z e^{(j\Phi u)}$ and the rotational speed $\omega_r(k)$. Stochastic effects are modelled as components $A_s(\omega_r)$ dependent on the rotational speed. The following hold:

$$A_{WV12}(\omega_r(k)) = A_u e^{(j\Phi u)} \omega_r^3(k) + A_z e^{(j\Phi z)} \omega_r(k) + A_s(\omega_r(k))$$

$A_u e^{(j\Phi u)}$, $A_z e^{(j\Phi z)}$ complex constants $A_s(\omega_r)$ complex, dependent on rotational speed The amplitude progression of the moving coil signals then forms a polynomial as a function of the rotational speed $\omega_r(k)$. The polynomial coefficients can be calculated by least squares approximation. For this purpose, the amplitude values $A_{WV}(\omega_r(1)), A_{WV}(\omega_r(2)), \ldots, A_{WV}(\omega_r(N))$ are calculated at various rotational speeds $\omega_r(k)$, k=[1, 2 ... N]. Using the data vectors $\Psi_A, Y_A$ $$Y_A = [A_{WV}(\omega_r(1)) \quad A_{WV}(\omega_r(2)) \quad \ldots \quad A_{WV}(\omega_r(N))]^T$$

$$\Psi_A = \begin{bmatrix} \omega_r(1) & \omega_r(2) & \ldots & \omega_r(N) \\ \omega_r(1)^3 & \omega_r(2)^3 & \ldots & \omega_r(N)^3 \end{bmatrix}^T$$

the system of equations $$Y_A = \Psi_A \begin{bmatrix} A_u e^{(j\varphi_u)} \\ A_z e^{(j\varphi_z)} \end{bmatrix}$$

can be established. The effect of the noise component $A_s$ is ignored. Approximations $\hat{A}_u$, $\hat{A}_z$ to the coefficients of the polynomial can be calculated by solving the equation. The approximations are calculated by solving the overdetermined system of equations. Known solution methods are minimisation of the least square error, orthogonalisation and inversion of the data matrix, two-sided orthogonalisation and inversion of the data matrix. The methods differ in computing time and numerical robustness. The computing program MATLAB uses the singularity value decomposition (SVD) method for the solution.

The component of the constraining forces on the unbalance moment $M_{AU,3} = \hat{A}_{z12}/\hat{A}_{u12}$ is used as the third feature.

The dependency of the vibration amplitudes on the rotational speed means that normally the features $M_{AU,1}$, $M_{AU,2}$ always exceed a lower limit. Large values of the standard deviations (wide dispersions) occur in particular in balancing runs which exhibit a large unbalance, and in these the amplitude increases greatly with increasing rotational speed. By contrast, balancing runs with almost completely balanced rotors only exhibit small variations and not a large increase. However, small changes in the amplitude still occur because of rolling stimulations, the effect of constraining forces and environmental effects. If the sensor system is electrically separated, the signal displayed by the measurement device consists merely of circuit noise. The progression of the amplitude is then independent of the rotational speed and flattened very considerably. The standard deviation is very small. Therefore, a lower limit $g_{AU,12}$ which is always exceeded in error-free operation can be found by way of a plurality of balancing runs with test rotors. If the sensor system is electrically separated, the value will fall below this limit value. Two symptoms $S_{A1}$, $S_{A2}$ are therefore calculated as follows from the features $M_{AU,1}$, $M_{AU,2}$ and the limit value $g_{AU,12}$:

$$S_{A1} = \begin{cases} 0 & \text{for } M_{AU,1} \geq g_{AU,12} \\ M_{AU,1} - g_{AU,12} & \text{for } M_{AU,1} < g_{AU,12} \end{cases}$$

$$S_{A2} = \begin{cases} 0 & \text{for } M_{AU,2} \geq g_{AU,12} \\ M_{AU,2} - g_{AU,12} & \text{for } M_{AU,2} < g_{AU,12} \end{cases}$$

$M_{AU,3}$, which describes the component of the constraining force effect in the unbalance moment, is a percentage value which is relatively low in the error-free case. If the value is very high, the measured unbalance moment is determined to a significant degree by constraining forces. If it is low, the measurement result predominantly reflects the unbalance effect. A limit value $g_{AU,3}$ which is not exceeded in the normal case can be determined. The symptom is then calculated as $$S_{A3} = \begin{cases} 0 & \text{for } M_{AU,3} \leq g_{AU,32} \\ M_{AU,3} - g_{AU,3} & \text{for } M_{AU,3} > g_{AU,3} \end{cases}$$

The following error symptom table describes the errors which can be detected by amplitude monitoring

| Amplitude monitoring | | | |
|---|---|---|---|
| | $S_{A1}$ | $S_{A2}$ | $S_{A3}$ |
| Electrical separation of sensor system, side 1 | ++ | 0 | 0 |
| Electrical separation of sensor system, side 2 | 0 | ++ | 0 |
| Constraining force effect | 0 | 0 | ++ |

++: strong reaction to error;
+: reaction to error;
0: no reaction to error

2. Determining Harmonic Amplitudes

Taking the amplitude spectra of measurement signals into account in the measuring process is a commonly used method for error identification by specialist staff, in which vibration amplitudes for the rotational speed and the whole multiples thereof are read from the raw measurement data using Fourier series. Excessively high harmonic amplitudes are generally interpreted as a sign of errors in the balancing process. A conventional method for calculating amplitudes of periodic vibrations is Fourier series analysis. According to the invention, methods for determining the power spectrum such as maximum entropy spectral estimation offer an advantageous alternative to the Fourier series in the case of highly defective signals. It is assumed that the measurement signal is in the form of N sampled values $U_{Ts}(k)=U_{Ts}(t=kT_0)$, where $T_0$ is the sampling rate. First, the autocorrelate $R_{UU}(\kappa)$ of the measurement signal is estimated.

$$R_{UU}(\kappa) = \frac{1}{N - |\tau| + 1} \sum_{k=1}^{N-|\tau|} U_{Ts}(k) U_{Ts}(k + \kappa)$$

Subsequently, an estimate of the power spectrum can be produced and the amplitudes of the steady-state vibrations can be calculated. A comparison with a fixed limit value could be used for symptom generation. However, based on experience, amplitudes also depend on other effects such as the lubrication of the bearings. The invention therefore attempts to calculate a reference spectrum without periodic components within a balancing run. By subtracting the spectra with and without periodic components, the periodic vibration components can be isolated.

Harmonic amplitudes occur in particular in the measuring process, since they appear there as periodic components in the signal. This results in substantial signal peaks, which stand out from the rest of the spectrum. During run-up, substantially smaller amplitudes occur when the components having the period of the rotational speed pass through the same rotational speed, since the signal energy is only narrowly distributed over the range under consideration. Run-up can thus be a type of reference for the amplitude. A respective spectrum for the harmonic amplitudes $A_{0,\omega}$ during run-up ($A^H_{0,\omega}$) and in the measuring process ($A^M_{0,\omega}$) is therefore calculated. Taking the difference between the spectra from the measuring process and from run-up reduces machine effects. This results in differential amplitudes $$\Delta A_{0,n\omega_r} = A^M_{0,\omega} A^H_{0,\omega}$$

The magnitude of the differential amplitudes is used for feature generation. An advantage of this method is that it is not the absolute value of the harmonic components in the measurement signal that is evaluated. In this case, only specialist staff who also specifically knew the damage-free spectrum of the machine would be able to evaluate from what amplitude onwards error effects can be assumed. For machining, only an imprecise estimate is possible without calculating a reference spectrum. By using the signal spectrum during run-up, a reference spectrum of this type is calculated in each balancing run. For the error type "loose bearing point", for example, the spectrum of the harmonic amplitudes exhibits differences from the error-free case in the differential amplitudes at $3\omega_r$, $4\omega_r$, $5\omega_r$, in both signal channels. The differential amplitudes of channel 1 ($A_{01\omega}$) and channel 2 ($A_{02\omega}$) are used for feature generation.

$$M_{OS,1} = \max(\Delta A_{01,2\omega_m}, \Delta A_{01,3\omega_m}, \Delta A_{01,4\omega_m}, \Delta A_{01,5\omega_m})$$

$$M_{OS,2} = \max(\Delta A_{02,2\omega_m}, \Delta A_{02,3\omega_m}, \Delta A_{02,4\omega_m}, \Delta A_{02,5\omega_m})$$

A limit value which includes the normal case is established as follows. For highly unbalanced rotors having a high fundamental vibration amplitude, small non-linear transfer effects also result in high harmonic amplitudes. By contrast, a small fundamental amplitude is normal when operating fully balanced rotors. The limit value is therefore formed from a fixed base component $g_{OS,g}$ and a percentage of the fundamental vibration $g_{OS,p} \cdot \Delta A_{0, \omega_m}$.

$$g_{OS} = g_{OS,g} + g_{OS,p} \cdot \Delta A_{02,\omega_m}$$

$$S_{O1} = \begin{cases} 0 & \text{for } M_{OS,1} \leq g_{OS} \\ M_{OS,1} - g_{OS} & \text{for } M_{OS,1} > g_{OS} \end{cases}$$

$$S_{O2} = \begin{cases} 0 & \text{for } M_{OS,2} \leq g_{OS} \\ M_{OS,2} - g_{OS} & \text{for } M_{OS,2} > g_{OS} \end{cases}$$

The following table describes the error symptom allocation for the method for determining harmonic amplitudes.

| Determination of harmonic amplitudes | | |
|---|---|---|
| | $S_{O1}$ | $S_{O2}$ |
| Loose connection of the bearing points to the base, side 1 | ++ | + |
| Loose connection of the bearing points to the base, side 2 | + | ++ |

++: strong reaction to error;
+: reaction to error;
0: no reaction to error

3. Envelope Method

The envelope method is a proven method for establishing bearing damage, which generally manifests itself as eruptions on the rolling surfaces. These eruptions lead to recesses in the smooth rolling surfaces of the inner ring, outer ring or roller bodies. Rolling over these recesses leads at regular intervals to a pulsed stimulation of the machine structure. Pulsed stimulation also occurs in the case of a jumping rotor. The stimulation of the machine structure is described as a pulsed periodic force stimulation $F_{u,p}(k)$.

$$F_{u,p}(k) = A_{s0} \sum_{(n=-0)}^{(n=+n_p)} \delta(kT_0 - nT_{Stoss})$$

In general, these pulsed surges cannot be measured directly since there is no sensor connected directly to the bearings. However, the effects of these surges on the machine structure are measurable. The machine structure of the balancing machine is a vibratory structure having various natural frequencies. In the case of an impulse-type impact on the machine structure, the structure reacts with an attenuation process $U_{Ts,Ls}(k)$.

$$U_{Ts,Ls}(k) = A_{sLs0} \cdot \left( \sum_{(n=-\infty)}^{(n=+\infty)} \delta(kT_0 - nT_{Stoss}) \right) * (e^{(-\alpha kT_0)} \cos(\omega_{res} kT_0 + \varphi_0))$$

The attenuation process is periodic and basically comprises components of the resonant frequencies $\omega_{res}$, which are close to the natural frequencies when there is little damping. It is therefore expedient to amplify the ranges around the resonant frequencies with a band-pass filter and to suppress secondary frequencies. The envelope is then generated from the filtered signal $U_{Ts,Bp}(k)$. To do this, the attenuation process is smoothed. One possibility involves rectification and low-pass filtering. The Hilbert transform of $U_{Ts,Bp}(k)$ offers an alternative. This adds a complex counterpart $jK_i(t)$ to a harmonic vibration $H_r(t)$, resulting in a complex vibration $H(t)$.

$$H_r(t) = \cos(\omega_{res}(t)kT_0 + \varphi_0)$$
$$H_i(t) = \sin(\omega_{res}(t)kT_0 + \varphi_0)$$
$$H(t) = H_r(t) + jH_i(t)$$
$$= e^{(j(\omega_{res}kT_0 + \varphi_0))}$$

The vibration $H_r(t)$ is modulated by a pulse train $$\left( \sum_{(n=-\infty)}^{(n=+\infty)} \delta(kT_0 - nT_{Stoss}) \right).$$

Taking the sum leads to the envelope $U_{Ts,Hk}(k)$ $$U_{Ts,Hk}(k) = |U_{Ts,Hil}(k)|$$

$$= A_{sLs0} \cdot \left( \sum_{(n=-\infty)}^{(n=+\infty)} \delta(kT_0 - nT_{Stoss}) \right) * (e^{(-\alpha kT_0)})$$

The envelope comprises a periodically decreasing function. The main frequency component corresponds to the damage frequency $f_{Stoss}$. The frequency spectrum of the envelope can be calculated by the maximum entropy method. There is a considerable stroke at the damage frequency. There are four different damage frequencies for damage to the outer ring and the inner ring of the rolling bearings for mounting the rotor and for a jumping rotor. Measurements on ground-down bearing components, to stimulate damage to the outside of the outer ring ARA, damage to the inside of the outer ring ARI and damage to the inner ring IRA, showed that the damage types "bearing damage ARA" and "jumping rotor" can be identified clearly from substantial peaks in the spectrum at frequencies $f_{Stoss,ARA}$, $\omega_r/2\pi$. The error types "IRA" and "ARI" result in smaller, but still visible increases in amplitude at the impact frequencies $f_{Stoss}$, IRA, $f_{Stoss,ARI}$. The amplitudes of the vibrations at the damage frequencies are used as features.

$$M_{HK,1} = U_{Ts,Hk}(\omega = 2\pi f_{Stoss,ARA})$$

$$M_{Hk,2} = U_{Ts,Hk}(\omega = 2\pi f_{Stoss,ARI})$$

$$M_{Hk,3} = U_{Ts,Hk}(\omega = 2\pi f_{Stoss,IRA})$$

$$M_{Hk,4} = U_{Ts,Hk}(\omega = \omega_r)$$

Symptoms are generated by a comparison with limit values which are based on empirical values. The following table shows the error symptom allocation for detectable errors.

| | Envelope method | | | |
|---|---|---|---|---|
| | $S_{H1}$ | $S_{H2}$ | $S_{H3}$ | $S_{H4}$ |
| Damage to the bearing | 0 | + | + | 0 |
| Damage to the bearing running surface | + | 0 | 0 | 0 |
| Jumping rotor | 0 | 0 | 0 | ++ |

++: strong reaction to error;
+: reaction to error;
0: no reaction to error

4. Determining the Noise Intensity

Interference stimulations acting on the machine externally increase the noise component of the measurement signal and decrease the accuracy of the measurement results. An estimate of the noise intensity can make it possible to infer the interference intensity. To calculate the noise intensity, it is assumed that only the unbalance vibration $F_{u,u}(t)$ and stochastic impacts $F_{u,s}(t)$ act as stimulation.

$$\underbrace{F_u(t)}_{total\ stimulation} = \underbrace{F_{u,u}(t)}_{unbalance\ vibration} + \underbrace{F_{u,s}(t)}_{stochastic\ component}$$

The measured values consist of the response of the system to the stimulation and the additive effect of an interference on the fundamental movement.

$$\underbrace{U_{Ts}(t)}_{measured\ values} = \underbrace{U_{Ts,u}(t)}_{unbalance\ effect} + \underbrace{U_{Ts,s}(t)}_{stoch.\ effect}$$

$U_{Ts,s}(t)$ comprises both the effects of the stochastic impact stimulations and the effects of external sources of interference. To take into account the effects of the interferences on the measurement signal, the signals are low-pass filtered. The frequency at measurement rotational speed $\omega_m$ forms the upper limit frequency of the filter. A reduced model can therefore be used. For the measured values $U_{Ts}(t)$, this results in $$U_{Ts}(t) = \frac{\Psi_0}{c_{a1}} \frac{d}{dt} F_u(t) - \Psi_0 \frac{d}{dt} s_f(t)$$

$s_f(t)$ represents the offset of the fundamental. The progression is treated as stochastic. Separation into unbalance signal and noise effects results in $$U_{Ts}(t) = \underbrace{\frac{\Psi_0}{c_{a1}} \frac{d}{dt} F_{u,u}(t)}_{U_{Ts,u}(t)} + \underbrace{\frac{\Psi_0}{c_{a1}} \frac{d}{dt} F_{u,s}(t) - \Psi_0 \frac{d}{dt} s_f(t) U_{Ts}(t)}_{U_{Ts,s}(t)} =$$

$$\frac{\Psi_0}{c_{a1}} \frac{d}{dt} F_u(t) - \Psi_0 \frac{d}{dt} s_f(t)$$

If $F_{u,s}(t)$ and $s_f(t)$ are treated as uncorrelated white noise processes, then for the autocorrelation function $\Phi_{uu}(\tau)$:

$$\Phi_{uu}(\tau \neq 0) = 0$$

$$\Phi_{uu}(0) = E\left\{\left(\frac{\Psi_0}{c_{a1}} F_{u,s}(t) - \Psi_0 s_f(t)\right)^2\right\}$$
$$= E\left\{\left(\frac{\Psi_0}{c_{a1}} F_{u,s}(t)\right)^2\right\} + E\{(\Psi_0 s_f(t))^2\}$$
$$= \sigma_R + \sigma_f$$
$$= P_s$$

The total noise intensity $P_s$ is the sum of the noise intensity of the rolling stimulation $\sigma_r$ and the fundamental interferences $\sigma_f$. In the measurement process, the unbalance vibration component $U_{Ts,u}(t)$ corresponds to a periodic vibration.

$$U_{Ts,u}(t) = U_v \sin(\phi_r(t) + \phi_v).$$

The amplitude $U_v$ and phase position $\phi_v$ of the vibration can be determined by Fourier analysis. It is thus possible to form a reconstruction $\hat{U}_{Ts,u}(t)$ of the unbalance vibration. This makes it possible to separate the noise effect from the unbalance vibration. This results in a reconstruction of the noise effect $\hat{U}_{Ts,u}(t)$ $$\hat{U}_{Ts,s}(t) = U_{Ts}(t) - \hat{U}_{Ts,u}(t)$$

$$\approx \Psi_0 \underbrace{\frac{d}{dt} \left(\frac{1}{c_{u1}} F_{u,s}(t) - s_f(t)\right)}_{\text{system effect} \quad \text{noise processes}}$$

$\hat{U}_{Ts,u}(t)$ thus corresponds to a sum of two different uncorrelated processes which are measured in the form of the first derivative thereof. The signal has further been low-pass filtered. The following examines how this effects the determination of the noise intensity. It is assumed that a reconstructed noise component $\hat{U}_{Ts,u}(t)$ has been calculated from discrete measured values $U_{Ts}(k)$.

For a sufficiently small sampling interval $T_0$, the system effect $$y(t) = \frac{d}{dt} u(t)$$

$$u(t) = \underbrace{\left(\frac{1}{c_{a1}} F_{u,s}(t) - s_f(t)\right)}_{\text{noise processes}}$$

$$y(t) = \hat{U}_{Ts,s}(t)$$

can be represented by a linear difference equation $$y(k) = \frac{1}{T_0}(u(k) - u(k-1))$$

A first-order difference is applied during quantisation. This results in a weighting function of $$g(k) = \begin{cases} \frac{1}{T_0} & \text{for } k = 0 \\ -\frac{1}{T_0} & \text{for } k = 1 \\ 0 & \text{otherwise} \end{cases}$$

With white noise at the input, this results in a cross-correlation function $\Phi_{uy}(\tau)$ and an autocorrelation function $\Phi_{yy}(\tau)$ of the reconstructed noise component $\hat{U}_{Ts,u}(t)$ $$\Phi_{uy}(\tau) = \Phi_{uu}(\tau) g(\tau)$$
$$\Phi_{yy}(\tau) = \Phi_{uu}(\tau)(g(\tau) * g(-\tau))$$
$$= P_s(g(\tau) * g(-\tau))$$

in which $$g(\tau) * g(-\tau) = \sum_{i=-N}^{N} g(i) g(k-i)$$

$$= \begin{cases} \frac{2}{T_0^2} & \text{for } k = 0 \\ -\frac{1}{T_0^2} & \text{for } k = 1, -1 \\ 0 & \text{otherwise} \end{cases}$$

Example measurements on a balancing machine have shown that the progression of the autocorrelation functions $\Phi_{yy}(\tau)$ corresponds closely to the theoretical estimate $$\Phi_{yy}(\tau) = P_s \cdot \begin{cases} \frac{2}{T_0^2} & \text{for } k = 0 \\ -\frac{1}{T_0^2} & \text{for } k = 1, -1 \\ 0 & \text{otherwise} \end{cases}$$

$\Phi_{yy}(-1)$, $\Phi_{yy}(0)$, $\Phi_{yy}(1)$ is therefore used to determine the noise intensity.

$$\begin{pmatrix} \frac{-1}{T_0^2} \\ \frac{2}{T_0^2} \\ -\frac{1}{T_0^2} \end{pmatrix} \cdot P_s = \begin{pmatrix} \Phi_{yy}(-1) \\ \Phi_{yy}(0) \\ \Phi_{yy}(1) \end{pmatrix}$$

$\Phi_{yy}$ is calculated using $$\Phi_{yy}(\tau) = \frac{1}{N - |\tau| + 1} \sum_{k=0}^{N-|\tau|} \hat{U}_{Ts,s}(k) \hat{U}_{Ts,s}(k+\tau)$$

An estimate of the noise intensity $\hat{P}_s$ can be created by solving the overdetermined system of equations. This only fluctuates slightly for measurements in a constant environment. It is therefore used as a feature.

$$M_N = \hat{P}_s$$

A sudden increase within a sequence of measurements indicates external sources of interference. Measurements are only made in one place during operation. Exceeding a fixed limit value $g_N$, which is to be determined during measurements, is therefore used as a symptom. In the course of the measurements, it has been found that in the case of bearing damage and a jumping rotor, the noise intensity is also increased by the additional impacts on the machine structure.

$$S_N = \begin{cases} 0 & \text{for } M_N \le g_N \\ M_N - g_N & \text{for } M_N > g_N \end{cases}$$

The following table shows the error symptom allocation for detectable errors.

|  | SNR $S_N$ |
| --- | --- |
| External interference effects | ++ |
| Damage to the bearing rolling surface | + |
| Jumping rotor | ++ |

++: strong reaction to error;
+: reaction to error;
0: no reaction to error

5. Determining the System Resonances

The machine resonances of the construction can normally be read clearly from the spectrum of the measurement signals. In the error-free case, the machine represents a vibratory system of which the resonant frequencies and resonance amplifications are approximately equal on both sides. Some error states affect these properties. A method for determining the resonant frequencies and resonance amplifications is therefore expedient. The method operates with measurement data from the run-up and measurement process of a machine. In addition, the method is represented using data from a run-up. The measured moving coil signals are processed as follows. Initially, frequencies outside the range in which the two resonance frequencies of the machine construction are found are removed using a band-pass filter. The lower limit frequency $\omega_{g1}$ of the filter is selected in such a way as to be greater than the rotational speed $\omega_m$ during the measuring process. This filters out the unbalance vibration. In the following $\omega_{g1}$ is set equal to 1.5 $\omega_m$. The upper limit frequency of the filter $\omega_{g2}$ is selected in such a way as to be slightly above the resonant frequency $f_{e,A2}$ of the parallel rotational vibration of the rotor and the construction.

$$\omega_{g2} = 1.2 \cdot 2\pi f_{e,A2}$$

The filtered signal $U_{Ts,Bp}(k)$ is thus left comprising only very slight effects of the unbalance vibration, and the frequency range is also limited to the range of the first two resonant frequencies. It is assumed that the signal is composed of the response of a linear vibratory system of order 4 to stochastic stimulations. Recursive parameter estimation is carried out using least squares. The method calculates a parametric transfer function. The band-pass filtering means that only the frequency range which is substantially affected by stochastic rolling stimulations is included in the signal. The filtered signal corresponds to the response of the system to the noise. The object is to calculate this response in the form of a parametric transfer function and subsequently to extract resonant frequencies and amplifications.

A linear difference equation $$y(k) = -c_1 y(k-1) - \ldots - c_m y(k-m) + v(k) + d_1 v(k-1) + d_n v(k-m)$$

is used for the transfer properties of the machine to approximate the differential equation for the model of the machine. The stimulation $v(k)$ corresponds to the effect of the stochastic components $F_{u1,s}$ and $F_{u2,s}$ and is modelled approximately as a white noise process. $y(k)$ are the measured values of the moving coils.

$$v(k) = \text{stationary noise process}$$

$$y(k) = U_{Ts}(k) = \Psi_0 \dot{s}_u$$

It is assumed that the sampling interval $T_0$ is sufficiently small that the sampling frequency is substantially greater than the frequencies present in the filtered signal. This means that the continuous differential equation can be approximated by the difference equation. The order m is selected in such a way as to reflect the differential equation of the model and effects of the band filter. The tests used m=8. Estimates $[c_1 \ldots c_m]$ and $[d_1 \ldots d_m]$ of the parameters are calculated by the least squares method. This makes it possible to determine the transfer function in the z-range $G_{res}(z)$ $$G_{res}(z) = \frac{Y(z)}{V(z)} = \frac{1 + \hat{d}_1 z^{-1} + \ldots + \hat{d}_n z^{-n}}{1 + \hat{c}_1 z^{-1} + \ldots + \hat{c}_m z^{-m}}$$

To calculate the natural frequencies, at least the poles of the transfer function in the z-range are calculated. This is done by forming the characteristic polynomial $$0 = 1 + \hat{c}_1 z^{-1} + \ldots + \hat{c}_m z^{-m}$$

and calculating the zeros thereof. This results in m poles $z_m$. The resonant frequencies can be calculated directly from the position of the poles. $z = e^{(jT_0\omega)}$, and therefore $$\omega_{res,m} = \frac{|\ln(z_m)|}{T_0}$$

the transfer functions $G_{res}(\omega)$ being calculated using $$\omega_{res,m} = \frac{|(\ln(z_m))|}{T_0}$$

The resonant frequencies and transfer functions are calculated for the two measurement signals $U_{Ts1}(k)$, $U_{Ts2}(k)$. The calculated transfer functions are $G_{res\ UTs1}(\omega)$ $G_{res\ UTs2}(\omega)$.

After the band-pass filtering, the signal basically comprises the effects of two main resonances $\omega_{e,A1}$, $\omega_{e,A2}$. The object of the following processing steps is to search for these two resonant frequencies. The calculated transfer functions $G_{res\ UTs1}(\omega)$ $G_{res\ UTs2}(\omega)$ are available for this purpose. The overall highest occurring resonant amplification $|G_{res,a1}|/(\omega_{res,\ a1})$ is sought first. The transfer function in which this amplification occurs is denoted as a and the other as b. In the transfer function b, the resonant frequency at the minimum distance from $\omega_{res,a1}$ is sought. The amplification $|G_{res,b1}|/(\omega_{res,b1})$ is calculated. The same process takes place when seeking the second resonant frequency $\omega_{res,a2}$. This leads to $|G_{res,a2}|/(\omega_{res,\ a2})$ and $|G_{res,b2}|/(\omega_{res,\ b2})$.

The respective ratio of the resonant amplifications is used as a feature for symptom generation. A calculation in dB has been found to be expedient.

$$M_{Res,1} = 10 \cdot \log_{10} \frac{|G_{res,a1}|}{|G_{res,b1}|}$$

$$M_{Res,2} = 10 \cdot \log_{10} \frac{|G_{res,a2}|}{|G_{res,b2}|}$$

A third feature $M_{res,3}$, as to which side has higher amplifications, is taken into account. This feature is used to determine on which side the error is present.

$$M_{Res,3} = 10 \cdot \log_{10} |G_{res,U_{Ts1}}1| - 10 \cdot \log_{10} |G_{res,U_{Ts2}}1|$$

Normally, $M_{res,1}$, $M_{res,2}$ do not exceed a limit value $g_{Res}$ which can be determined by test measurements. Exceeding the limit value is therefore used as a symptom in each case. $M_{res,3}$ is used directly as a symptom.

$$S_{R1} = \begin{cases} 0 & \text{for } M_{Res,1} \leq g_{Res} \\ M_{Res,1} - g_{Res} & \text{for } M_{Res,1} > g_{Res} \end{cases}$$

$$S_{R2} = \begin{cases} 0 & \text{for } M_{Res,2} \leq g_{Res} \\ M_{Res,2} - g_{Res} & \text{for } M_{Res,2} > g_{Res} \end{cases}$$

$$S_{R3} = M_{Res,3}$$

An error symptom allocation for detectable errors by determining the system resonances is described in the following table.

| Determination of the system resonances | $S_{R1}$ | $S_{R2}$ | $S_{R3}$ |
|---|---|---|---|
| Electrical separation of the sensor connection, side 1 | + | + | − |
| Electrical separation of the sensor connection, side 1 | + | + | + |
| Restriction of movement of the vibrating bridge, side 1 | ++ | ++ | − |
| Restriction of movement of the vibrating bridge, side 2 | ++ | ++ | + |

++: large positive stroke;
+: positive stroke;
0: no stroke;
−: negative stroke

6. Symptom Generation with Process-model-Based Methods

Process-model-based methods use models of the input/output properties of systems for an improved diagnosis. As described in the section on process models, the input and output signals of a system and a process model are used for this purpose. Parameter estimation methods and parity equations are often used. All of these methods assume that input signals are measurable. Process-model-based methods can only be used on the balancing machines to a limited extent, since basically only output measurement signals and process models are available. The stimulating unbalance forces (=inputs) are unknown. If the machine is operated with a known rotor and a known unbalance, the unbalance forces can be calculated. However, in universal machines runs with known unbalances very rarely take place. In the context of process-model-based error identification, a modified methodology has been found to be effective in accordance with the invention. Estimated unbalances are determined from the measurement signals. These are used to calculate estimated unbalance forces. The calculation is carried out on the basis of a reduced model. Errors in the machine mean that the result of this calculation may differ from the actual unbalances. Incorrect unbalance forces are calculated and the input signal is not reconstructed correctly.

A process model is calculated between estimated unbalance forces and measured values. Subsequently, it is checked whether this is in accordance with the model which is used in the error-free case. Excessively large deviations from this model relation indicate errors and are used as a symptom. In the case of correct unbalance measurement, the unbalance forces, the model and the measurement values are in a consistent relationship.

Symptoms can be calculated by process-model-based methods in various ways. Parameter evaluation and parity equations are often used. One method is least squares (LS) parameter evaluation. In LS parameter evaluation, the model parameters are estimated from input and output signals on the basis of a fixed parametric model structure. Subspace methods have also been tested for applying the method to unbalance machines in the case of unknown unbalances. When these methods are applied, it is checked whether the model relation between reconstructed unbalance forces and moving coil measurements corresponds to the structure of the reduced model. For symptom generation, the subspace method has been found to be the most effective. This method is therefore preferred. It is disclosed in European patent application EP 2 034 284 A2, to which reference is hereby made.

With the disclosed signal-model-based and process-model-based methods, a total of 15 symptoms are available for error diagnosis. These are summarised against the identifiable errors in an error symptom table appended to the end of the description. This overview is based on measurements which have been taken. It has been found that for some error types, symptoms do not exhibit properties which can be allocated unambiguously. For these error types, the respective symptoms are not taken into account. This predominantly occurs for symptoms which are produced specially for the identification of another error; see for example symptom $S_{A3}$, which is configured specially for the identification of constraining forces. The properties of this symptom are ambiguous for many other error types, and in these cases it is not taken into account in the diagnosis.

The disclosed methods make it possible to identify and isolate the errors listed in the table. Fuzzy logic diagnosis can be carried out on the basis of the table, and specifies the most probable state of the system, for example "error-free", "error electr. separation sensor signal, side 1". Displaying the diagnosis results in this way means that the reliability of the prediction can be described at the same time as the determined cause of the error.

The above sections present methods for error identification and error diagnosis. A self-monitoring system is assembled using these methods. Based on the measurement data picked up, feature generation is carried out using signal and process models. Symptoms are calculated from the comparison with a stored normal state. Large strokes for symptoms are indications of errors. The error diagnosis, i.e. inter alia the allocation of symptoms to an error state, is carried out using fuzzy logic. With the 15 symptoms described in this process it is possible in principle to diagnose 13 error types. The reliability of the detection will be demonstrated in the following by way of exemplary qualitative empirical results.

Electrical separation of the sensor system and mechanical loosening of the sensor rods are errors which have a direct effect on the balancing result. When these errors occur, excessively small unbalances are calculated and the mass ratio of the rotor is not fully compensated. The purchaser of a balancing machine will intuitively expect errors of this type, which are considered easy to identify, to be intercepted. Detection of the errors during operation therefore represents an added benefit which is provided effectively. Detection took place reliably and robustly on a test machine in the numerous test series recorded. To identify and diagnose errors in the sensor system, it was sufficient to generate the symptoms $S_{S1}$, $S_{S2}$, $S_{A1}$, $S_{A2}$. Symptoms $S_{R1}$, $S_{R2}$ may further be generated for backup. The diagnosis result can be output in a relatively user-friendly manner by way of an error report with an identification of the reliability.

The peripheral devices of a balancing machine comprise a measurement device and bearings. Specific errors in the measurement device can lead to incorrect balance results. The errors under consideration on the vibrating bridge and loose bearing points can generally still be detected without monitoring if there is an experienced operator on site. Blockage of the vibration path is visible to the operator when the machine cover is lifted. If the machine is operated with loose bearing points, considerable audible noise is produced, inter alia. However, it has been found that during operation, indications of this type are rarely noticed by operators. Furthermore, there are fully automated machines which are not attended by any staff. The results of the balancing of a workpiece do not generally undergo further testing. Errors and the resulting incorrectly balanced rotors can therefore result in high costs. For automated machines, monitoring errors in the peripheral devices may be an expedient development of the operation of the machine. A development may also be expedient in hand-operated machines which are operated by untrained staff. The identification of errors has been tested intensively by the method according to the invention. Identification was reliable and diagnosis was carried out effectively for the above error states.

The rotor is placed into the balancing machine as a workpiece. If errors in the rotor lead to incorrect measurements, this lies within the rotor manufacturer's area of responsibility. It is therefore in the interests of the manufacturers of balancing machines to be able to separate these error states from errors in the machine itself. This prevents poorly balanced rotors from being returned to a poorly functioning machine because of rotor errors. Detecting the effect of constraining moments due to skewed rotor pins is therefore an important function of the monitoring. With the method according to the invention, the detection of errors of this type can be integrated into normal balancing operation. This thus makes it possible to develop the existing machine operation in an expedient manner.

If the initial unbalance of the rotor is so great that it lifts off the support rollers, the rebound leads to increased wear. If protective measures fail, a lifting rotor can cause considerable damage. Identification of jumping rotors should therefore be integrated into standard monitoring.

Wear errors such as damage to the outer and inner ring of the rotor bearing and damage to the bearing running surface of the bearing occur in many regions of rotation systems. The method according to the invention has been tested on a balancing machine. The test results were obtained using measurements with partially ground components. Errors on the running surface could therefore be detected relatively reliably in each balancing process. Errors in the rolling bearings in the form of eruptions on the inner and outer ring could also be detected, but the identification was less reliable than for damage to the bearing running surface. The identification is based on a particular amount of wear being exceeded.

| | | Error symptom table | | | | | | | | | | | | | | |
|---|---|---|---|---|---|---|---|---|---|---|---|---|---|---|---|---|
| | | Process-model-based | | | | | Signal-model-based | | | | | | | | | |
| | | $S_{S1}$ | $S_{S2}$ | $S_{A1}$ | $S_{A2}$ | $S_{A3}$ | $S_{O1}$ | $S_{O2}$ | $S_{R1}$ | $S_{R2}$ | $S_{R3}$ | $S_{H1}$ | $S_{H2}$ | $S_{H3}$ | $S_{H4}$ | $S_N$ |
| Error-free | | 0 | 0 | 0 | 0 | 0 | 0 | 0 | 0 | 0 | 0 | 0 | 0 | 0 | 0 | 0 |
| Loose sensor connection | Side 1 | ++ | 0 | 0 | 0 | # | 0 | 0 | # | # | # | 0 | 0 | 0 | 0 | 0 |
| | Side 2 | 0 | ++ | 0 | 0 | # | 0 | 0 | # | # | # | 0 | 0 | 0 | 0 | 0 |
| Electrical separation of sensor system | Side 1 | # | # | ++ | 0 | # | # | # | + | + | − | 0 | 0 | 0 | 0 | # |
| | Side 2 | # | # | 0 | ++ | # | # | # | + | + | + | 0 | 0 | 0 | 0 | # |
| Loose foundation | Side 1 | # | # | 0 | 0 | # | ++ | + | 0 | 0 | 0 | 0 | 0 | 0 | 0 | # |
| | Side 2 | # | # | 0 | 0 | # | + | ++ | 0 | 0 | 0 | 0 | 0 | 0 | 0 | # |
| Vibrating bridge movement restriction | Side 1 | 0 | 0 | 0 | 0 | # | 0 | 0 | ++ | ++ | − | 0 | 0 | 0 | 0 | 0 |
| | Side 2 | 0 | 0 | 0 | 0 | # | 0 | 0 | ++ | ++ | + | 0 | 0 | 0 | 0 | 0 |

-continued

Error symptom table

| | Process-model-based | | Signal-model-based | | | | | | | | | | | | |
|---|---|---|---|---|---|---|---|---|---|---|---|---|---|---|---|
| | $S_{S1}$ | $S_{S2}$ | $S_{A1}$ | $S_{A2}$ | $S_{A3}$ | $S_{O1}$ | $S_{O2}$ | $S_{R1}$ | $S_{R2}$ | $S_{R3}$ | $S_{H1}$ | $S_{H2}$ | $S_{H3}$ | $S_{H4}$ | $S_N$ |
| Effect of constraining forces | + | + | 0 | 0 | ++ | # | # | 0 | 0 | 0 | 0 | 0 | 0 | 0 | 0 |
| External interference vibrations | 0 | 0 | 0 | 0 | # | 0 | 0 | 0 | 0 | 0 | 0 | 0 | 0 | 0 | ++ |
| Damage to the bearing | 0 | 0 | 0 | 0 | 0 | # | # | 0 | 0 | 0 | 0 | + | + | 0 | # |
| Damage to the bearing running surface | 0 | 0 | 0 | 0 | 0 | # | # | 0 | 0 | 0 | + | 0 | 0 | 0 | # |
| Jumping rotor | 0 | 0 | 0 | 0 | 0 | # | # | 0 | 0 | 0 | 0 | 0 | 0 | ++ | # |

++: large positive stroke; +: positive stroke; 0: no stroke; −: negative stroke; #: not taken into account

What is claimed is:

1. A method for automatic detection and identification of errors in a balancing machine during operation, comprising the following steps:
rotating a rotor by a drive, the rotor being provided with an unbalance and being rotatably mounted in a vibratory bearing in the balancing machine;
measuring a rotational frequency of the rotating rotor and vibrations generated by the rotor;
delivering measurement signals which comprise measured values of the rotational frequency and the vibrations being generated to an evaluation computer; and
evaluating the measurement signals,
wherein said step of evaluating uses a calculation based on mathematical models of dynamic properties of the balancing machine, said models describing stimulations of a structure of the machine due to the unbalance and at least one of the following: rotor geometry, the bearing, possible damage to the bearing, constraining forces, movement restriction of the vibratory bearing, and external interference vibrations,
wherein features including vibration characteristics or process parameters are calculated by a signal-model-based method from the measurement signals using various signal models, including at least one of constant-frequency vibrations, stochastic signals, and variable-frequency vibrations, and discrepancies are established by comparing calculated features with predetermined normal features of an error-free process, and
wherein the discrepancies, as error symptoms, are allocated to error types, and the error symptoms allocated to one or more error types are evaluated to determine causes of errors.

2. The method according to claim 1, wherein the features are additionally calculated using a process-model-based method and discrepancies are established by comparison with predetermined normal features of an error-free process.

3. The method according to claim 1, wherein a rule-based error diagnosis system based on fuzzy logic is used to determine the causes of errors, the probability of the occurrence of each error being determined by intermediate steps of converting the error symptoms into linguistic variables, i.e., (fuzzification) and evaluating an "IF" part, i.e., (aggregation) and a "THEN" part, i.e., (accumulation) of each rule of a rule base.

4. A method for automatic detection and identification of errors in a balancing machine during operation, comprising the following steps:
rotating a rotor by a drive, the rotor being provided with an unbalance and being rotatably mounted in a vibratory bearing in the balancing machine;
measuring a rotational frequency of the rotating rotor and vibrations generated by the rotor;
delivering measurement signals which comprise measured values of the rotational frequency and the vibrations being generated to an evaluation computer; and
evaluating the measurement signals,
wherein said step of evaluating uses a calculation based on mathematical models of dynamic properties of the balancing machine which describe stimulations of the machine structure due to at least one of the following: the unbalance, rotor geometry, the bearing, and possible damage to the bearing,
wherein features including vibration characteristics or process parameters are calculated by a signal-model-based method from the measurement signals, and discrepancies are established by comparing calculated features with predetermined normal features of an error-free process, and
wherein the measurement signals having a frequency which varies over time are subjected to a wavelet transformation after filtering, and after calculating wavelet transforms, complex amplitude progressions of the vibrations are estimated, and wherein an amplitude progression of a reconstructed unbalance moment is estimated for an error-free case and features for error identification are formed by comparison thereof with complex amplitude progressions.

5. The method according to claim 4, wherein the measurement signals having a frequency which varies over time are detected during a run-up of the rotor to a measurement rotational speed.

6. The method according to claim 4, wherein a low-pass filter is used to filter the measurement signals.

7. The method according to claim 4, wherein the wavelet transformation uses a Morlet Wavelet.

8. The method according to claim 4, wherein estimation of the complex amplitude progressions of the vibrations uses a least squares method.

9. A method for automatic detection and identification of errors in a balancing machine during operation, comprising the following steps:
rotating a rotor by a drive, the rotor being provided with an unbalance and being rotatably mounted in a vibratory bearing in the balancing machine;
measuring a rotational frequency of the rotating rotor and vibrations generated by the rotor;

delivering measurement signals which comprise measured values of the rotational frequency and the vibrations being generated to an evaluation computer; and
evaluating the measurement signals,
wherein said step of evaluating uses a calculation based on mathematical models of dynamic properties of the balancing machine which describe stimulations of the machine structure due to at least one of the following: the unbalance, rotor geometry, the bearing, and possible damage to the bearing,
wherein features including vibration characteristics or process parameters are calculated by a signal-model-based method from the measurement signals, and discrepancies are established by comparing calculated features with predetermined normal features of an error-free process, and
wherein a respective power spectrum is calculated for harmonic amplitudes during run-up of the rotor to a measurement rotational speed and during the measuring process, and taking the difference between the power spectra from the measuring process and from the run-up results in differential amplitudes which are used to form features for error identification.

10. A method for automatic detection and identification of errors in a balancing machine during operation, comprising the following steps:
rotating a rotor by a drive, the rotor being provided with an unbalance and being rotatable mounted in a vibratory bearing in the balancing machine;
measuring a rotational frequency of the rotating rotor and vibrations generated by the rotor;
delivering measurement signals which comprise measured values of the rotational frequency and the vibrations being generated to an evaluation computer; and
evaluating the measurement signals,
wherein said step of evaluating uses a calculation based on mathematical models of dynamic properties of the balancing machine which describe stimulations of the machine structure due to at least one of the following: the unbalance, rotor geometry, the bearing, and possible damage to the bearing,
wherein features including vibration characteristics or process parameters are calculated by a signal-model-based method from the measurement signals, and discrepancies are established by comparing calculated features with predetermined normal features of an error-free process, and
wherein by filtering the measurement signals, ranges around resonant frequencies are amplified and secondary frequencies are suppressed, an envelope is generated from a filtered signal and a frequency spectrum of an envelope is calculated, and features for error identification are generated by comparing the frequency spectrum with limit values which are based on empirical values, and the frequency spectrum of the envelope is calculated by the maximum entropy method.

11. The method according to claim 10, wherein a band-pass filter is used to filter the measurement signals.

12. A method for automatic detection and identification of errors in a balancing machine during operation, comprising the following steps:
rotating a rotor by a drive, the rotor being provided with an unbalance and being rotatably mounted in a vibratory bearing in the balancing machine;
measuring a rotational frequency of the rotating rotor and vibrations generated by the rotor;
delivering measurement signals which comprise measured values of the rotational frequency and the vibrations being generated to an evaluation computer; and
evaluating the measurement signals,
wherein said step of evaluating uses a calculation based on mathematical models of dynamic properties of the balancing machine which describe stimulations of the machine structure due to at least one of the following: the unbalance, rotor geometry, the bearing, and possible damage to the bearing,
wherein features including vibration characteristics or process parameters are calculated by a signal-model-based method from the measurement signals, and discrepancies are established by comparing calculated features with predetermined normal features of an error-free process, and
wherein a noise intensity of a noise component, separate from the unbalance vibration, of the measurement signals is estimated and the estimated noise intensity exceeding a predetermined limit value is used as a feature for indicating errors caused by external interference effects, damage to the bearing rolling surface and lumping of the rotor.

13. The method according to claim 12, wherein the measurement signals are filtered by a low-pass filter to separate the noise component from the unbalance vibration, the measurement rotational speed forming an upper limit frequency of a low-pass filter.

14. A method for automatic detection and identification of errors in a balancing machine during operation, comprising the following steps:
rotating a rotor by a drive, the rotor being provided with an unbalance and being rotatably mounted in a vibratory bearing in the balancing machine;
measuring a rotational frequency of the rotating rotor and vibrations generated by the rotor;
delivering measurement signals which comprise measured values of the rotational frequency and the vibrations being generated to an evaluation computer; and
evaluating the measurement signals,
wherein said step of evaluating uses a calculation based on mathematical models of dynamic properties of the balancing machine which describe stimulations of the machine structure due to at least one of the following: the unbalance, rotor geometry, the bearing, and possible damage to the bearing,
wherein features including vibration characteristics or process parameters are calculated by a signal-model-based method from the measurement signals, and discrepancies are established by comparing calculated features with predetermined normal features of an error-free process, and
wherein filtering the measurement signals suppresses the effects of the unbalance vibration and a frequency range is restricted to a range of the first two resonant frequencies, and wherein the measurement signal is composed of a response of a linear system of order four or higher to stochastic stimulation, a recursive parameter estimation is carried out to calculate parametric transfer functions of the first two resonant frequencies, and subsequently the resonant frequencies and a ratio of the resonant amplitudes is determined, a feature being formed by the ratio of the resonance amplitudes exceeding a limit value.

15. The method according to claim 14, wherein a band-pass filter is used to filter the measurement signals.

16. The method according to claim 14, wherein the recursive parameter estimation uses a least squares method.

* * * * *